United States Patent [19]
Fujie et al.

[11] Patent Number: 5,136,425
[45] Date of Patent: * Aug. 4, 1992

[54] SELF-CLEANING PLATE-SHAPED DEVICE INCLUDING A VIBRATOR WITH OSCILLATIONS PARALLEL TO THE PLANE OF THE PLATE

[75] Inventors: Naofumi Fujie, Nagoya; Tomoaki Imaizumi, Hoi; Koji Ito, Kariya; Shoji Okada, Toyota, all of Japan

[73] Assignee: Aisin Seiki Kabushiki Kaisha, Kariya, Japan

[*] Notice: The portion of the term of this patent subsequent to Jun. 18, 2008 has been disclaimed.

[21] Appl. No.: 370,853

[22] Filed: Jun. 23, 1989

[30] Foreign Application Priority Data

Jun. 23, 1988 [JP] Japan .................. 63-83373[U]

[51] Int. Cl.$^5$ .................. B60R 1/06; B60S 1/02; B08B 7/02
[52] U.S. Cl. .................. 359/507; 310/323; 310/238; 15/250.003
[58] Field of Search .................. 350/582–587; 310/238, 321–324; 15/250 R, 30, 250.02, 250.05; 219/219

[56] References Cited

U.S. PATENT DOCUMENTS

| 3,180,626 | 4/1965 | Mettler | 310/328 |
| 3,191,913 | 6/1965 | Mettler | 310/328 |
| 3,904,274 | 9/1975 | Feinleib et al. | 350/582 |
| 4,367,948 | 1/1983 | Suzuki | 355/203 |
| 4,387,973 | 6/1983 | Martin | 350/582 |
| 4,533,219 | 8/1985 | Adrich | 350/632 |
| 4,768,256 | 9/1988 | Motoda | 15/250 R |
| 5,025,187 | 6/1991 | Fujie et al. | 15/250 R |

FOREIGN PATENT DOCUMENTS

| 145046 | 11/1980 | Japan | 15/250 R |
| 57-70754 | 5/1982 | Japan | 15/250 R |
| 59-8548 | 1/1984 | Japan | 350/582 |

Primary Examiner—Jon W. Henry
Attorney, Agent, or Firm—Burns, Doane, Swecker & Mathis

[57] ABSTRACT

An automotive mirror is provided with an actuator which provides vibrations to the mirror so as to remove foreign substances from the surface of the mirror. The actuator may be piezoelectric device which operates in a predetermined, control manner so as to remove foreign substances from the mirrored surface.

8 Claims, 6 Drawing Sheets

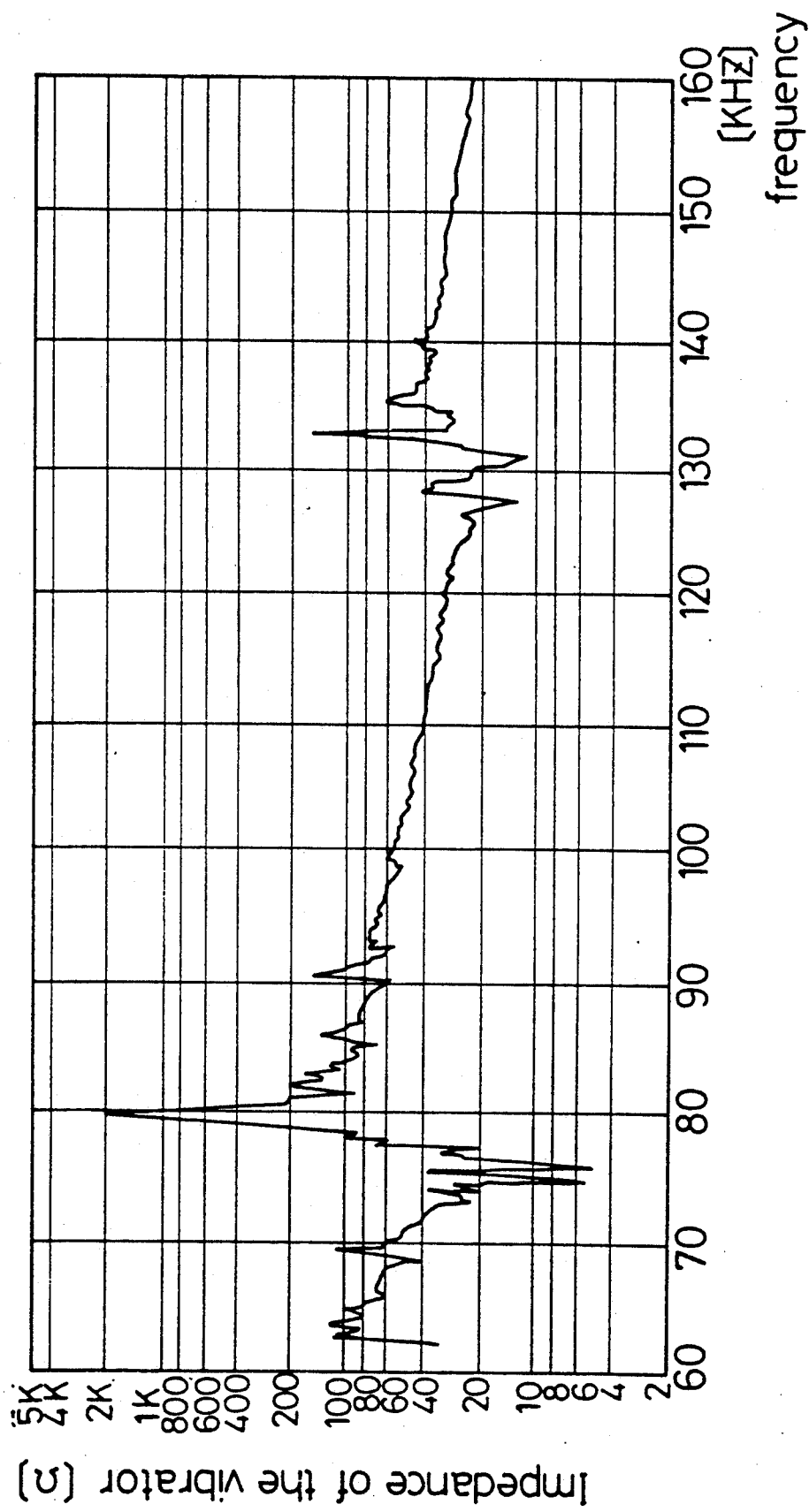

(PRIOR ART)

SELF-CLEANING PLATE-SHAPED DEVICE INCLUDING A VIBRATOR WITH OSCILLATIONS PARALLEL TO THE PLANE OF THE PLATE

BACKGROUND OF THE INVENTION

1. Field of the Invention

This invention relates to a self-cleaning plate shaped device which, for example, can be utilized for an automotive rear-view mirror.

2. Description of the Related Art

Japanese Laid-Open patent publication No. 59-8548 published on Jan. 17, 1984 discloses a conventional cleaning device of an automotive rear-view mirror. Referring now to FIG. 10, the conventional device comprises a plate member 1 of the automotive mirror, a vibrator 2 for vibrating the plate member 1, and an oscillator 3 for supplying A.C. power to the vibrator 2. Water drops on the plate member 1 are removed by vibration of the plate member 1 The water droplets on the plate member 1 drop off and are atomized away when the plate member 1 is vibrated.

The entire plate member 1 must be vibrated uniformly in order to remove water drops from the whole surface of the plate member 1. The conventional device utilizes a vibrator 2 which has substantially the same dimensions as the plate member 1 in order to vibrate the whole surface of the plate member 1.

However, localized oscillations may be generated in part of the vibrator 2 due to the influence of the principal vibration of the plate member 1, if the vibrator 2 has substantially the same dimension as the plate member 1. These localized oscillations may concentrate stresses into pinpoint locations which may generate heat. The concentrated stresses may generate cracks in the vibrator 2 and the generated heat may represent waste heat. Thus, the durability of the vibrator 2 may deteriorate and the amount of wasted power may increase.

SUMMARY OF THE INVENTION

Accordingly, one of the objects of this invention is to obviate the above drawbacks of the conventional device.

It is also an object of this invention to vibrate the entire surface of a plate member by a vibrator which is smaller than the plate member.

Further, it is an object of this invention to improve the durability of the vibrator.

Furthermore, it is an object of this invention to conserve power of the vibrator.

To achieve the above objects, and in accordance with the principles of the invention as embodied and broadly described herein, the self-cleaning plate-shaped device comprises a generally planar plate member, and vibrator means mounted on the plate member for propagating oscillations in the plate member substantially entirely parallel to the plane of the plate member so as to remove foreign substances from the plate member.

BRIEF DESCRIPTION OF THE DRAWINGS

The accompanying drawings, are incorporated in and constitute a part of the specification, illustrate an embodiment of the invention, and, together with the description, serve to explain the principles of the invention.

FIG. 5 is a graph showing an electrical characteristic of the vibrator in accordance with the first embodiment of this invention.

DETAILED DESCRIPTION OF THE PREFERRED EMBODIMENTS

Figure 1:
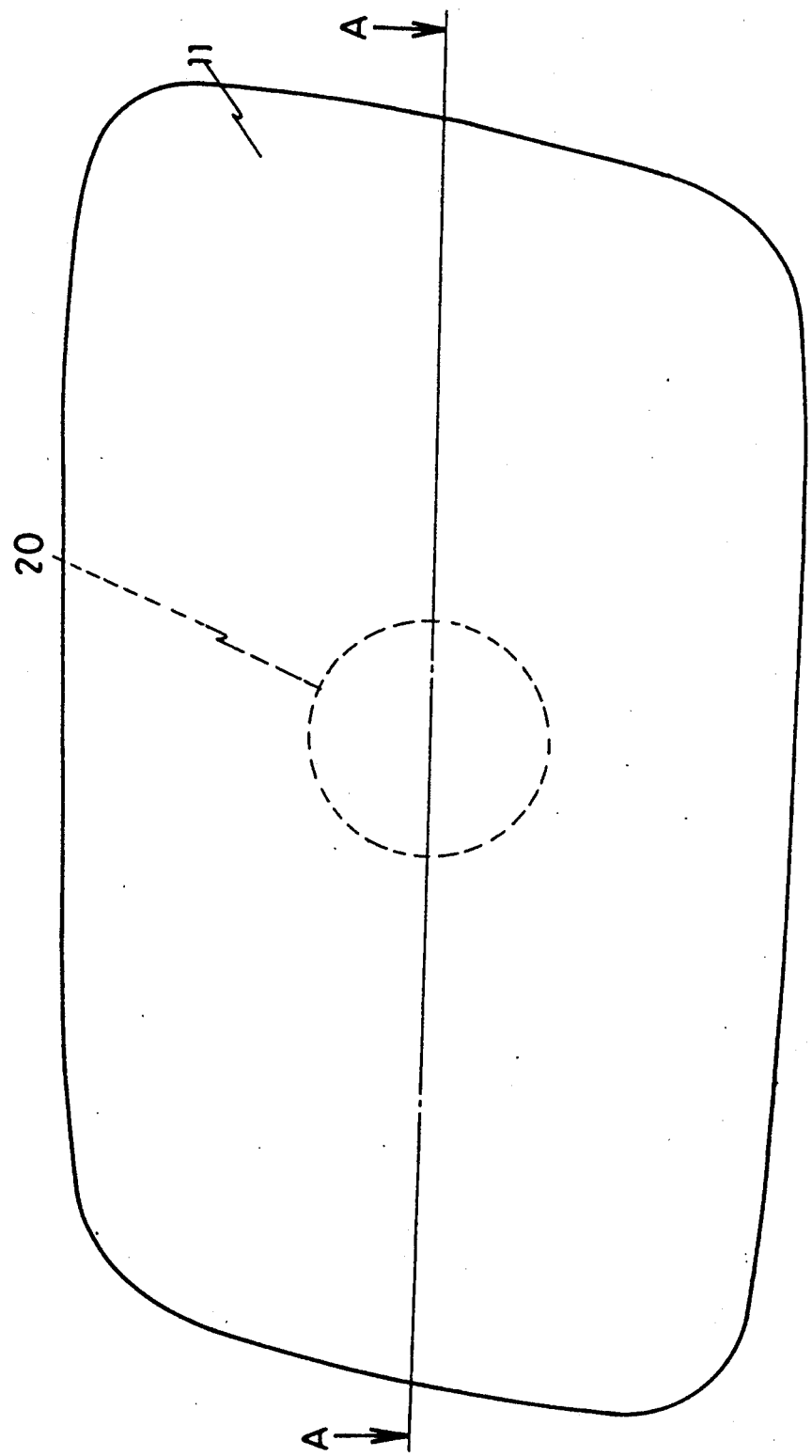
FIG. 1 is a plan view of a rear-view mirror in accordance with a first embodiment of this invention.

Reference will now be made in detail to the present invention, an example of which is illustrated in the accompanying drawings. In accordance with the invention, a self-cleaning plate-shaped device comprises a plate member 11, a vibrator 20 for vibrating the plate member 11 and an oscillator 40 for supplying power to the vibrator 20. Further, the vibrator 20 comprises a piezoelectric element 23 having a flat shape and provided with parallel flat electrodes 21 and 22 fixedly connected to each of the opposed surfaces of the piezoelectric element.

Figure 2:
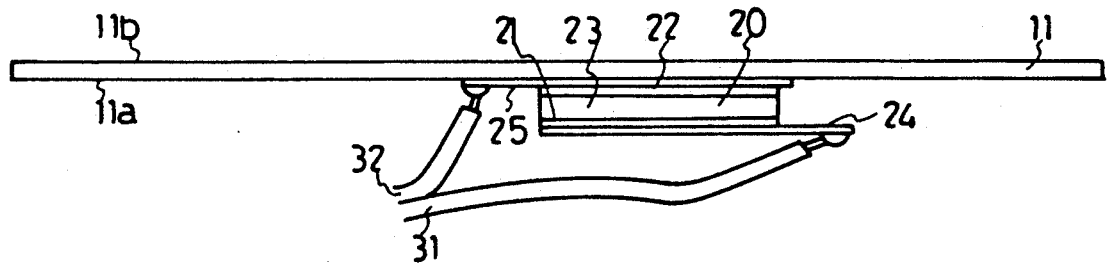
FIG. 2 is a cross sectional view taking along line I—I in FIG. 1.
Figure 3:
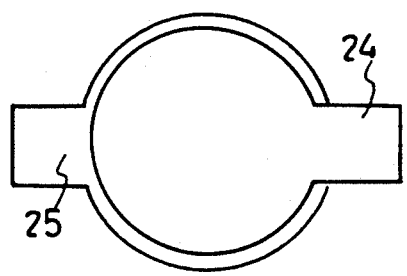
FIG. 3 is a plan view of a piezoelectric vibrator in accordance with the first embodiment of this invention.

Referring now to FIGS. 1, 2 and 3, the self-cleaning plate-shaped device is explained in greater detail. A disc-shaped piezoelectric element 23 is adhered to substantially the center of a mirror 11. The piezoelectric vibrator 20 has a pair of parallel flat electrodes 21, 22 positioned opposite to each other. The electrodes 21, 22 are integrally formed onto each opposed surface of the piezoelectric element 23. A conducting plate 24 is adhered to the electrode 21 by a conductive adhesive. A conductive wire 31 is soldered to the conducting plate 24. Further, a conducting plate 25 is adhered to the electrode 22 by a conductive adhesive. A conductive wire 32 is soldered to the conducting plate 25. The conducting plate 25 is rigidly adhered to the back side 11a of the mirror 11. The piezoelectric vibrator 20 is expanded or contracted in the thickness direction of the vibrator 20 (i.e., the vertical direction in FIG. 2) and along the surface of the mirror 11 (i.e., the horizontal direction in FIG. 2), when power is supplied to the vibrator 20 through the conductive wires 31, 32.

The piezoelectric vibrator 20 is expanded or contracted in response to electric flux density which is applied to the piezoelectric element 23. Therefore, if the electric flux is concentrated in various locations, an excessive stress may occur in those concentrated locations where the electric flux is collected. Accordingly, it is preferable for the vibrator to distribute the electric flux to the piezoelectric element 23 as uniformly as possible. Otherwise, a crack or cracks may be generated from the concentrated locations where the stress is collected, and the vibrator 20 may prematurely break down.

In the first embodiment of the invention, the parallel flat electrodes 21, 22 are utilized in order to apply a parallel and uniform electric flux to the piezoelectric element 23. Therefore, the stress may be distributed uniformly in the piezoelectric element 23.

Further, if the piezoelectric vibrator 20 is over heated, polarization of the vibrator 20 may be deteriorated. Moreover, the polarization may be partially deteriorated when the conductive wires 31, 32 are soldered to the electrodes 21, 22 directly. When the vibrator 20 is expanded and contracted repeatedly after soldering, stresses may be gathered in those locations where the conductive wires 31, 32 are soldered. Accordingly, cracks may be generated in those locations where the stress is gathered and the vibrator 20 may break down or otherwise fail.

In the first embodiment of the invention, the conductive plates 24, 25 are adhered to the parallel flat electrodes 21, 22 by the conductive adhesive. A layer of the adhesive prevents the soldering heat from being transferred to the piezoelectric element 23. Accordingly, soldering heat is prevented from being transferred to the piezoelectric element 23. Further, only a small amount of soldering heat is transferred to the piezoelectric element 23 after dissipating onto the conductive plates 24, 25. Therefore, the whole piezoelectric element 23 is heated uniformly. Thus, even if the polarization of the vibrator 20 is slightly deteriorated, the deterioration is uniformly generated. Accordingly, any stresses caused by soldering the conductive wires 31, 32 is distributed uniformly in the piezoelectric element 23.

As described above, stress is not gathered or pinpointed in one portion of the piezoelectric element 23 in the first embodiment. Therefore, the durability of the vibrator 20 is improved.

The conductive plates 24, 25 can be adhered to the electrodes 21, 22 after soldering the conductive wires 31, 32. If this is done, the piezoelectric element 23 is not subjected to the soldering heat as the soldering heat can be adequately radiated from the conductive plates 24, 25 sufficiently before adhering.

Figure 4A:
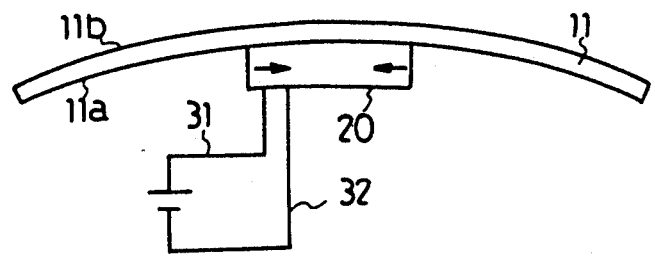
FIGS. 4a, 4b and 4c are diagrams for explaining the vibration of a vibrator in accordance with the first embodiment of this invention.

Referring now to FIG. 4a, an operation of the first embodiment is explained. When the conductive wire 31 is connected to the "+" terminal of a battery and the conductive wire 32 is connected to the "−" terminal of the battery, the vibrator 20 contracts mainly along the surface of the mirror 11. At this time, the back side 11a of the mirror 11 is subjected to a large compressive stress from the vibrator 20. As a result, the mirror 11 is bent by the vibrator 20.

Figure 4B:
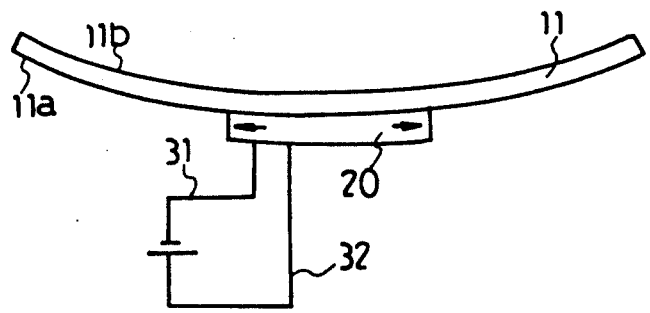
Figure 4C:
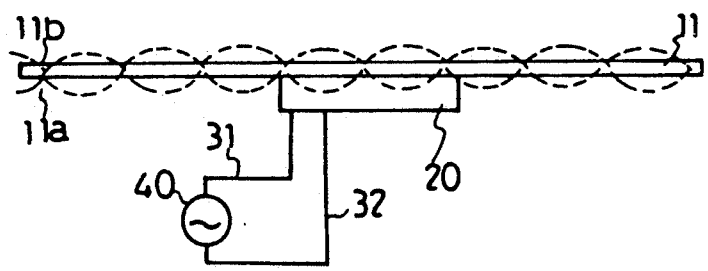

When the conductive wire 31 is connected to the "−" terminal of a battery and the conductive wire 32 is connected to the "+" terminal of the battery in FIG. 4b, the vibrator 20 expands mainly along the surface of the mirror 11. At this time, the back side 11a of the mirror 11 is subjected to a large expansion stress from the vibrator 20. As a result, the mirror 11 is bent opposite to the first direction, as discussed above, by the vibrator 20.

When the conductive wires 31, 32 are connected to the oscillator 40 and A.C. power is supplied to the vibrator 20, the vibrator 20 is expanded and contracted repeatedly. As a result, the mirror 11 is bent repeatedly. When a frequency is properly selected, a uniform standing wave having a large amplitude is generated on the entire mirror 11 due to the resonance of the mirror 11. The reflecting surface 11b is moved at a high velocity by the standing wave. Therefore, water droplets on the mirror 11 receive a large amount of kinetic energy from the mirror 11. The water droplets are moved off and atomized away from the reflecting surface 11b of the mirror 11.

In the first embodiment, the frequency of the oscillator 40 is established at about 74 KHz. It is preferable for the oscillating frequency to be established higher than an audible range so as to prevent the mirror 11 from generating an aural noise.

The piezoelectric vibrator 20 has its own resonant frequency due to its shape. Accordingly, it is preferable for the shape of the piezoelectric vibrator 120 to be selected based on the resonant frequency of the mirror 11. A typical automotive mirror has at least one resonant frequency within about 70 KHz to 80 KHz. Therefore, the piezoelectric vibrator 20 has a resonant frequency within about 70 KHz to 80 KHz in the first embodiment. However, if the mirror 11 has other lower or higher resonant frequencies, another frequency may be utilized for cleaning the mirror 11.

FIG. 5 shows a characteristic of the piezoelectric vibrator 20 in the first embodiment. This characteristic was measured with a typical automotive mirror 11 which is commercially available. The vibrator 20 was fixed to the gravity center of the mirror 11. The dimensions of the mirror 11 and the vibrator 20 are shown in Table 1.

TABLE 1

| mirror | almost parallelogram, 160 (mm) × 90 (mm) |
|---|---|
| vibrator | disc shape, diameter < 160 (mm), thickness = 2.8 (mm) |

The resonant frequency of the mirror 11 was about 70 KHz when the characteristic was measured. However, the resonant frequency of the mirror 11 was shifted to about 73 KHz after the vibrator 20 was adhered to the mirror 11.

As shown in FIG. 5, the impedance of the piezoelectric vibrator 20 varied largely in the range from 70 KHz to 80 KHz. Accordingly, it is evident from this characteristic that there are plural resonant frequencies between 70 KHz and 80 KHz.

Further, the moving velocity on the reflecting side 11b of the mirror 11 became more than 300 mm/s at the center of the vibrator 20, and became more than 1000 mm/s at the outer circumference of the mirror 11.

Furthermore, the vibration on the mirror 11 did not change significantly due to the position where the vibrator 20 was adhered. Accordingly, the vibrator 20 need not necessarily be adhered to the gravity center of the mirror 11.

In the first embodiment, a disc shaped vibrator 20 is utilized. The disc shaped vibrator 20 is preferable for the self-cleaning plate-shaped device because a continuous wave which surrounds the vibrator 20 is generated on the mirror 11. Therefore, a uniform vibration can be generated on the mirror 11 by the continuous wave which surrounds the vibrator 20.

Figure 6:
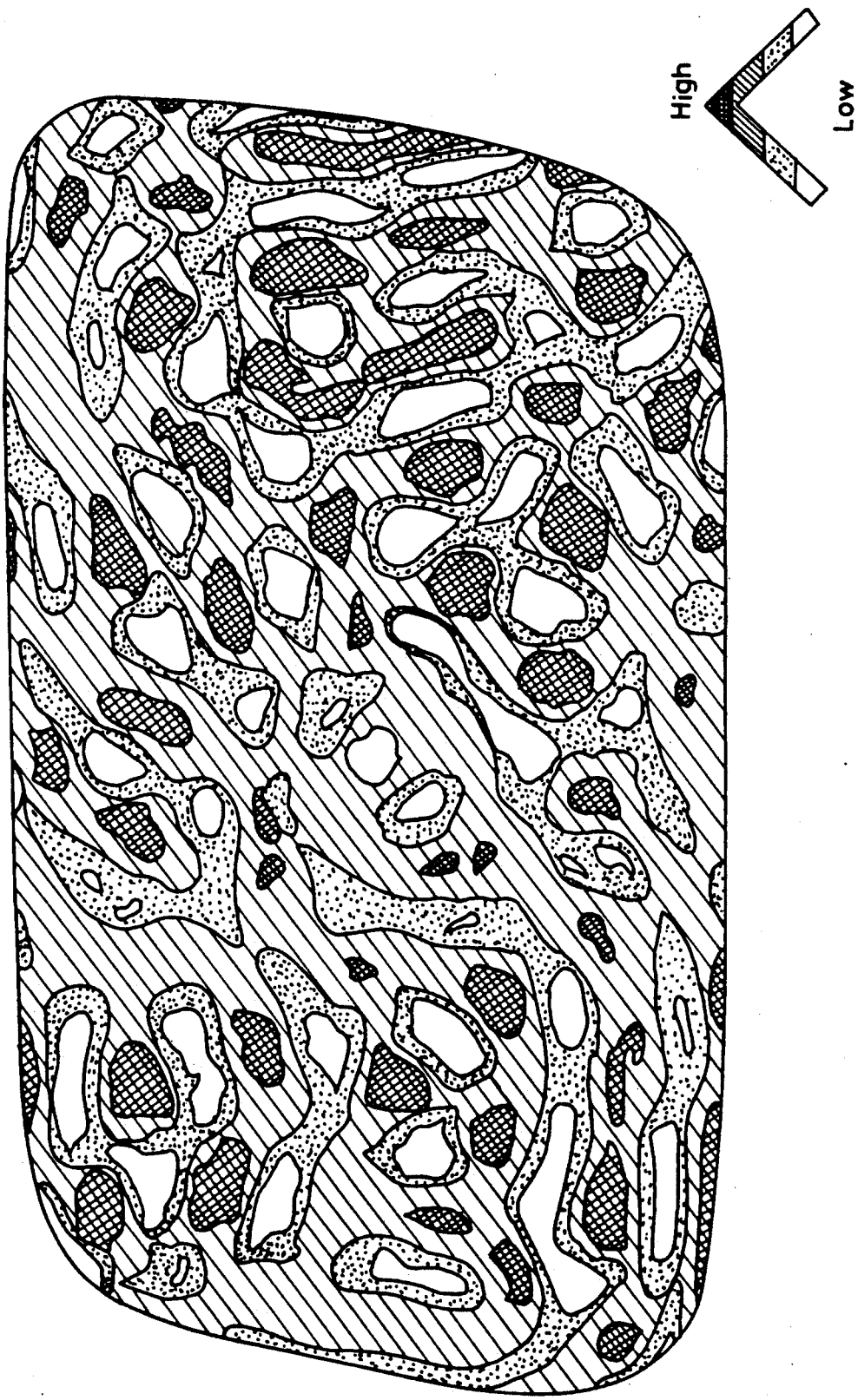
FIG. 6 is a distribution chart showing the distribution of the vibration amplitude on a mirror in accordance with the first embodiment of this invention.

FIG. 6 shows a distribution chart of the vibration on the mirror 11. This chart is an analysis of the Finite Element Method. This distribution chart clearly shows that nodes and loops of the vibration are distributed on the entire mirror 11 uniformly. Water droplets are removed from portions on the mirror 11 where the moving velocity exceeds a predetermined level. That is to say, water droplets on the mirror 11 are removed from the portions near the loops of the vibration.

In the first embodiment, the vibrator 20 is smaller than the mirror 11. Therefore, no stresses are concentrated in the vibrator 20 and no localized oscillations are generated on the vibrator 20. Therefore, the durability of the vibrator 20 is improved and A.C. power requirements are reduced due to reduced dimension of the vibrator 20.

Figure 7:
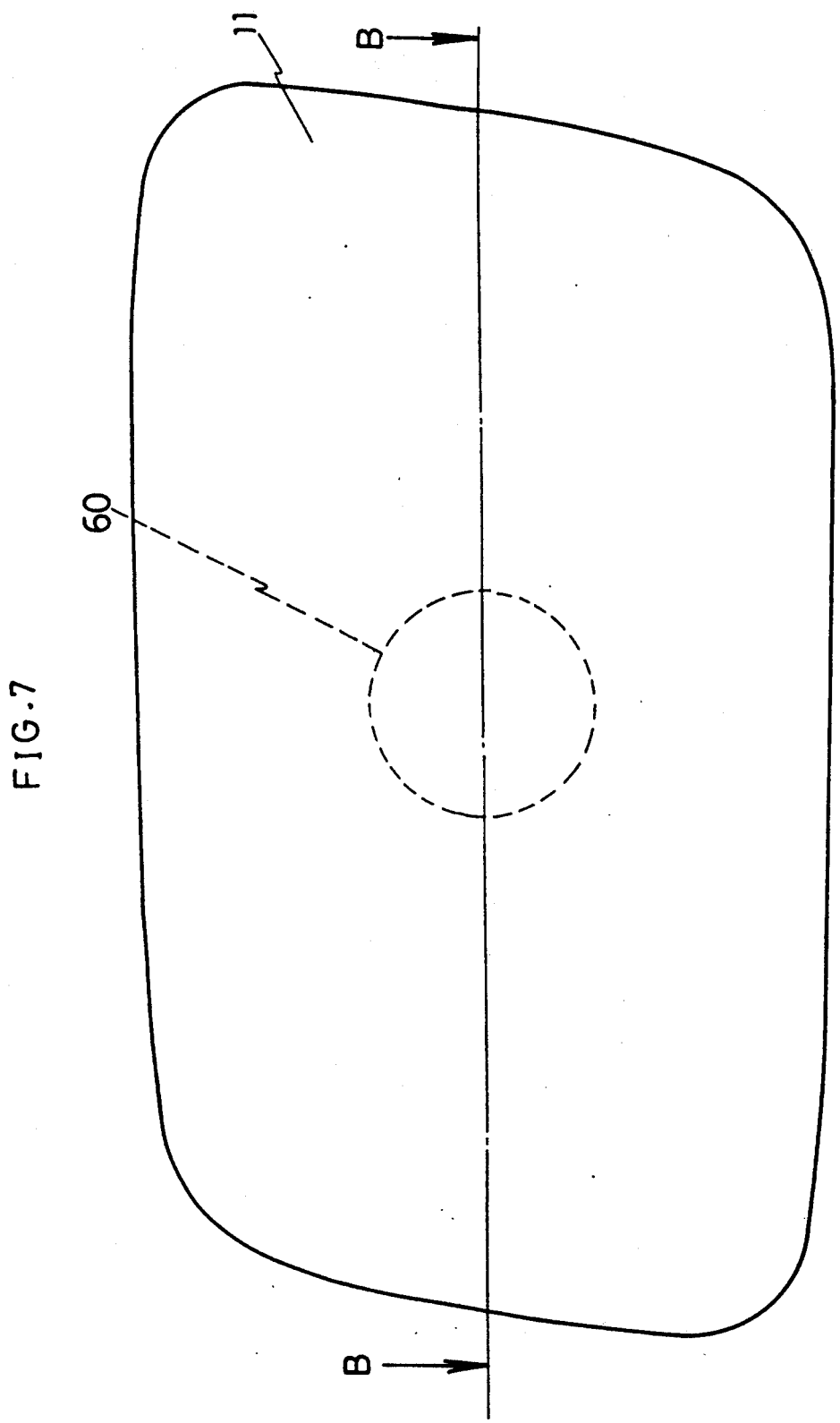
FIG. 7 is a plan view of a rear-view mirror in accordance with a second embodiment of this invention.
Figure 8:
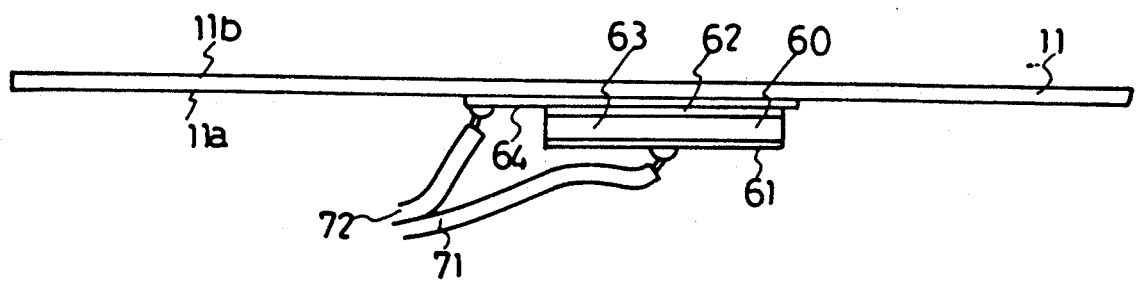
FIG. 8 is a cross-sectional view taking along line II—II in FIG. 7.
Figure 9:
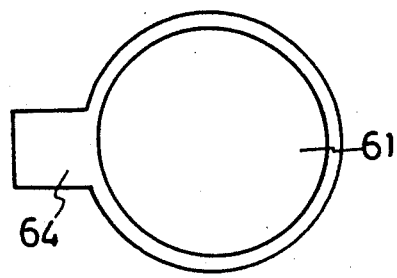
FIG. 9 is a plan view of a piezoelectric vibrator in accordance with the second embodiment of this invention.
Figure 10:
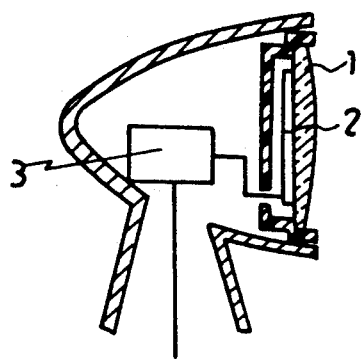
FIG. 10 is a cross-sectional view of a conventional device.

Referring now to FIGS. 7, 8 and 9, the second embodiment is explained. A piezoelectric vibrator 60 is utilized instead of the piezoelectric vibrator 20 in the second embodiment. The piezoelectric vibrator 60 comprises a piezoelectric element 63 having a disc shape and parallel flat electrodes 61, 62 which are fixed onto each opposed surface of the piezoelectric element 63. A conducting plate 64 is adhered to the flat electrode 62 by a conductive adhesive. The conducting plate 64 is rigidly adhered to the back side 11a of the mirror 11. Further, a conductive wire 71 is soldered to the electrode 61 directly, and a conductive wire 72 is soldered to the conducting plate 64.

Accordingly, while A.C. power is supplied to the vibrator 60 through the conductive wires 71 and 72, a parallel and uniform electric flux is applied to the piezoelectric element 23. Therefore, the stress may be distributed uniformly in the entire piezoelectric element 23.

The second embodiment has slightly lower durability than the first embodiment due to the direct connection, but has sufficient endurance for an automotive mirror.

The other construction and operation in accordance with the second embodiment is the same as the first embodiment. Therefore, detailed explanations for the second embodiment are omitted from this specification.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A self-cleaning plate shaped device comprising:
   a generally planar plate member; and
   a single vibrator mounted on the plate member for propagating oscillations in the plate member substantially parallel to the plane of the plate member so as to completely remove foreign substances from the plate member, said single vibrator being smaller than said planar member and including a substantially flat piezoelectric element, a pair of planar electrodes fixed on opposite sides of the piezoelectric element, and means for supplying power to the electrodes.

2. The device of claim 1 wherein the plate member includes a mirrored surface and a back surface, the vibrator being mounted on the back surface.

3. The device of claim 1 wherein the vibrator includes a conducting plate attached to one of the electrodes.

4. The device of claim 1 wherein the vibrator includes a pair of conducting plates, one of the pair of plates being attached to each of the electrodes.

5. The device of claim 4 wherein the vibrator further includes a conductive adhesive for adhering the plates to the electrodes.

6. The device of claim 1 wherein the vibrator includes a vibrator for generating inaudible vibrations.

7. The device of claim 1 wherein the vibrator is a disc-shaped vibrator.

8. The device of claim 1 wherein the vibrator includes a pair of substantially parallel flat electrodes mounted on the plate member in parallel relation thereto.

* * * * *